United States Patent [19]

Seshimo et al.

[11] Patent Number: 5,170,034
[45] Date of Patent: Dec. 8, 1992

[54] METHOD AND APPARATUS FOR WELDING ROBOT CONTROL

[75] Inventors: Tatsuya Seshimo, Narashino; Shigeyoshi Yokoyama; Raiji Shimomura, both of Sakura; Tukasa Shiina, Narashino, all of Japan

[73] Assignees: Hitachi, Ltd., Tokyo; Hitachi Keiyo Engineering Co., Ltd., Narashino, both of Japan

[21] Appl. No.: 661,110

[22] Filed: Feb. 26, 1991

[30] Foreign Application Priority Data

Mar. 2, 1990 [JP] Japan .................. 2-049466

[51] Int. Cl.⁵ .............................. B23K 9/12
[52] U.S. Cl. ...................... 219/125.1; 901/42
[58] Field of Search ........... 219/125.1, 125.11, 124.34; 901/42

[56] References Cited

U.S. PATENT DOCUMENTS

| | | | |
|---|---|---|---|
| 4,445,022 | 4/1984 | Mori | 219/125.1 |
| 4,626,644 | 12/1986 | Parmeggiani | 219/61 |
| 4,647,753 | 3/1987 | Nakashima et al. | 219/125.1 |
| 4,772,776 | 9/1988 | Siina | 219/125.1 |

FOREIGN PATENT DOCUMENTS 59-54470 3/1984 Japan.
63-278675 11/1988 Japan.

Primary Examiner—Clifford C. Shaw
Attorney, Agent, or Firm—Fay, Sharpe, Beall, Fagan, Minnich & McKee

[57] ABSTRACT

A method and a system for controlling a welding robot is disclosed, in which at the time of restarting the welding operation after a provisional welding stoppage which may occur during a series of welding operation by a robot, the welding operation is restarted from a position receded along the welding line thus far followed. A memory unit sequentially holds the position data along the welding line during the welding operation. The position receded along the welding line is calculated in accordance with the position data held in the memory unit during the provisional welding operation stoppage.

5 Claims, 9 Drawing Sheets $P_1 \rightarrow P_t \rightarrow P_s \rightarrow P_2$

- P₁: VECTOR FROM ROBOT ORIGIN TO WELDING START POSITION P₁
- P₂: VECTOR FROM ROBOT ORIGIN TO WELDING START POSITION P₂
- Pt: VECTOR FROM ROBOT ORIGIN TO PROVISIONAL STOPPAGE POINT Pt
- Ps: VECTOR FROM ROBOT ORIGIN TO WELDING RESTARTING POINT Ps

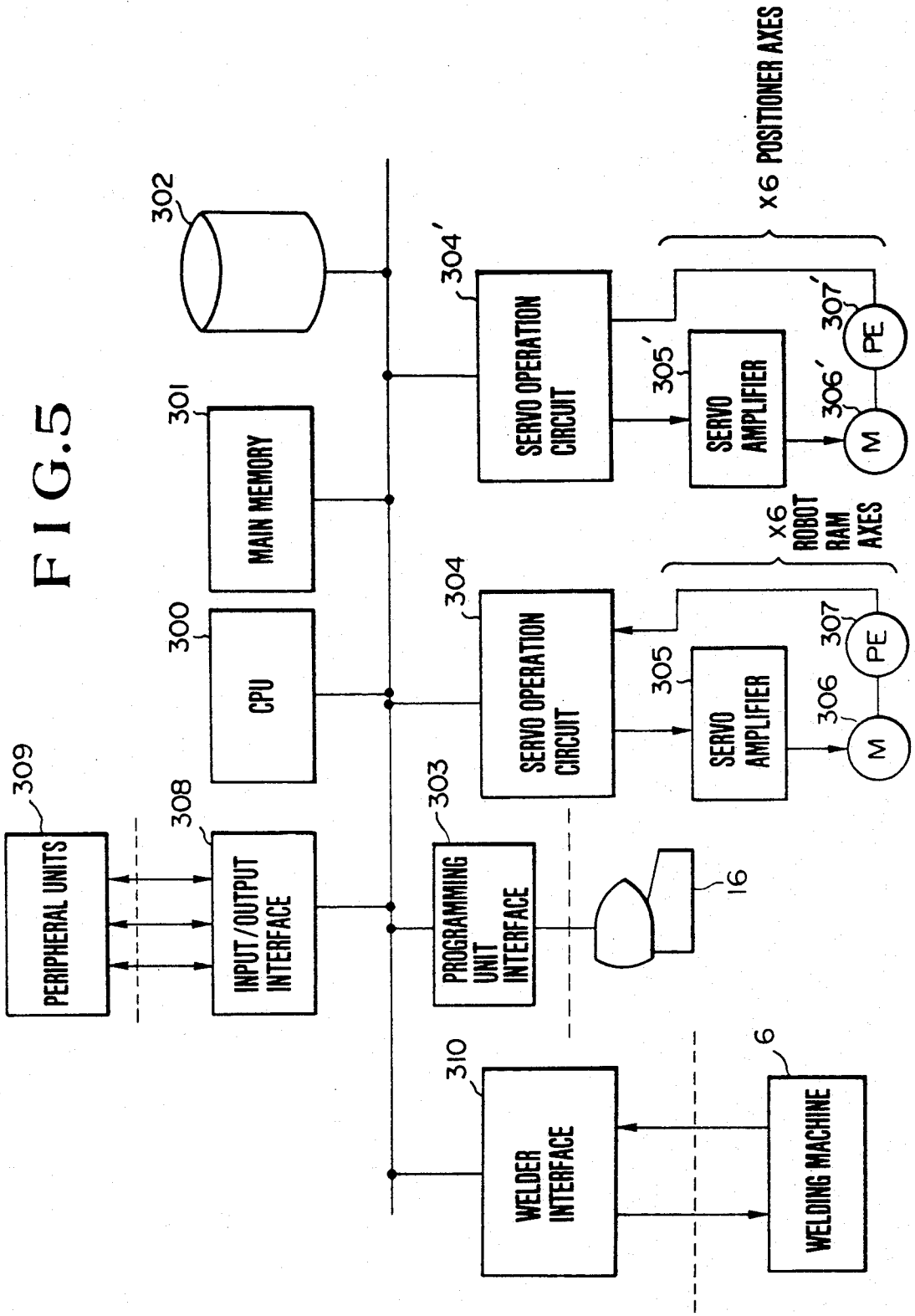

RECORDING OF PRESENT POSITION DATA Pc

DETERMINATION OF WELDING RESTARTING POINT Ps (I < N)

DETERMINATION OF WELDING RESTARTING POINT Ps (I ≧ N)

GOING BACK FROM Pt To Ps FOLLOWING
EACH OF RECORDED INTERPOLATION POINTS

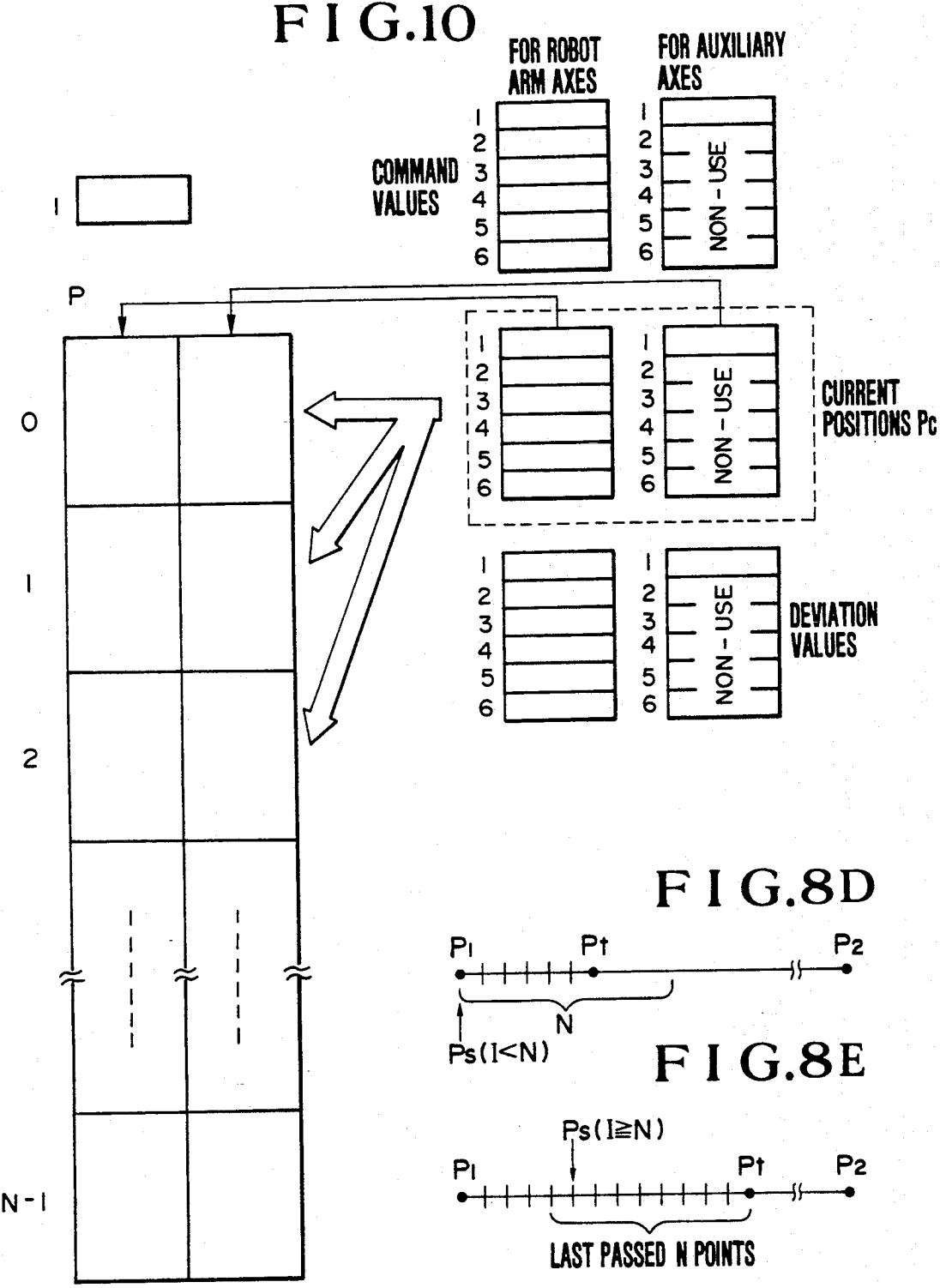

METHOD AND APPARATUS FOR WELDING ROBOT CONTROL

BACKGROUND OF THE INVENTION

The present invention relates to a welding robot control apparatus, or more in particular to a control apparatus suitable for a welding robot of such a type as to perform the welding work by moving both a welding torch and a workpiece.

In arc welding, a welding bead is formed while moving a welding torch in relative fashion along a welding line on a workpiece. In stopping the robot instantaneously, therefore, the welding operation is required to be halted from the standpoint of maintaining the welding quality. Such a stoppage of the welding operation will hereinafter be referred to as a provisional stoppage.

In the case where welding is stopped in the middle of a welding operation, however, a dent is likely to occur in the bead and the workpiece, and due to a cutting off of the supply of a shield gas, an oxide layer (solidified slug) of a high electrical resistance is deposited on the dent. If the welding operation is restarted under this condition, arc vanishing is likely to occur, and even if the arc is generated, a problem of reduced welding strength results due to the remnant of the dent.

FIG. 1 is a diagram for explaining this problem. In FIG. 1, reference numeral 1 designates a workpiece, and numeral 2 a torch. The hatched part represents a bead (soldified weld metal) formed as a result of the welding. If an arc is turned on at point A to proceed with the welding operation to a point C, provisional stoppage of welding at a mid-point B would cause a dent in the bead and the workpiece as shown. Upon the arc being turned off, a shield gas which has been supplied so far is also cut off, which causes an oxide layer (solidified slug) of a high electrical resistance to be deposited on the surface of the molten weld metal which is deposited on the dent. As a result, in restarting the welding operation from point B by turning on the arc, there is a case where the arc would not be generated. Even if the arc is generated, sufficient welding strength may not be obtained since the dent cannot be completely removed.

A conventional technique for resolving the problem described above is disclosed in JP-A-63-278675.

SUMMARY OF THE INVENTION

According to the method of welding disclosed in JP-A-63-278675, as shown in FIG. 2, the welding operation is started by a torch 2 mounted on the finger of a robot from a welding starting point $p_1$ toward a welding ending point $p_2$ on a workpiece 1. If the welding operation is stopped provisionally midway, in order to prevent the trouble of arc vanishing which might be caused at the subsequent time of restarting the welding, a welding restarting point Ps receded by a distance $\Delta l$ designated beforehand on the welding line is determined, so that the robot is moved until the forward end of the torch 2 arrives at the welding restarting point Ps. After the forward end of the torch 2 has reached the welding restarting point Ps, the welding operation is resumed toward the welding ending point $p_2$. The size of the dent depends on such factors as the welding voltage, welding current and the material of the workpiece. The length $\Delta l$ is required to be sufficiently large to enable the torch to return to a point before the initial point of dent.

The welding restarting point Ps is calculated, as shown in FIG. 3, by representing each point as a vector from the robot origin O and by using the equation below.

$$\lambda = \Delta l/L \qquad (1)$$
$$= \Delta l/\sqrt{(x_t - x_i)^2 + (y_t - y_i)^2 + (z_t - z_i)^2}$$

Assume that the vector from the robot origin O to the welding starting point $p_1$ is Pl, that to the point of provisional stoppage Pt is Pt, and the vector of the welding restarting point Ps receded from the provisional stoppage point Pt toward the welding starting point $p_1$ by the length $\Delta l$ is Ps. Then, $$Ps = Pt + \lambda(Pl - Pt) \qquad (2)$$
$$= \lambda Pl + (1 - \lambda)Pt$$

From equations (1) and (2), $$Ps = \begin{vmatrix} x_3 \\ y_3 \\ z_3 \end{vmatrix} = \begin{vmatrix} \lambda x_1 + (1 - \lambda)x_t \\ \lambda y_1 + (1 - \lambda)y_t \\ \lambda z_1 + (1 - \lambda)z_t \end{vmatrix} \qquad (3)$$

where $Pl=(x_1, y_1, z_1)$ and $Pt=(xt, yt, zt)$ are existent within the robot control unit, and therefore by giving $\Delta l$, it is possible to calculate the welding restarting point Ps.

In the aforementioned prior art method, however, the point of restarting the welding is determined only from the distance covered by the finger of the robot without taking into consideration the operation of a positioner or the like cooperating with the robot. As a result, in such cases as mentioned below, the welding restarting point Ps coincides with the provisional stoppage point $p_t$, thereby undesirably causing a welding fault such as arc vanishing.

(1) The case where the positioner carrying the workpiece is moved for the welding operation without changing the finger position of the robot.

(2) The case where a carriage of a robot is moved for the welding operation without changing the finger position of the robot.

According to the above-mentioned conventional apparatus, the welding restarting point Ps is determined from equations (1) and (3), and therefore another problem is that the welding restarting point Ps is incapable of being determined correctly even by an independent operation of the robot if it is operated by a circular interpolation method other than linear interpolation.

Accordingly, it is an object of the present invention to provide a method and an apparatus for controlling a welding robot, which is free from the above-mentioned problems.

Another object of the present invention is to provide a method and an apparatus for controlling a welding robot in which a welding fault is unlikely to occur at the time of restarting from provisional stoppage in the course of a welding operation performed by two or more devices including a robot and a positioner.

The above-mentioned objects are achieved by providing a memory means for sequentially holding the position data on a welding line during the welding operation. A particular position receded or back along the welding line is calculated on the basis of the position data held in the memory means at the time of provisional welding stoppage. A welding restarting point receded to the particular position where a welding fault is unlikely to occur along the direction toward the welding starting point is automatically prepared after provisional stoppage in the course of a welding operation by one or more devices including a robot and a positioner. The robot and/or the positioner is operated until the forward end of the torch arrives at the welding restarting point at the time of restart. The welding operation is restarted from the welding restarting point, and the robot and/or the positioner is moved in such a manner as to direct the forward end of the torch toward the welding ending point.

According to the present invention, there is provided a memory means for holding a position data sequentially on a welding line during the welding operation. Therefore a welding restarting point as receded to a point where a welding fault is not easily caused is automatically determined along the direction of a welding starting point on the welding line after provisional stoppage during the welding process by the operation of two or more devices including a robot and a positioner, so that at the time of restarting the welding operation, the robot and the positioner are moved until the forward end of the torch reaches the welding restarting point automatically determined. Thus the welding operation is restarted from the particular welding restarting point with the robot and the positioner operated in such a manner as to direct the forward end of the torch toward a welding ending point.

For the reason mentioned above, according to the present invention, at the time of restarting from a point of provisional stoppage, the forward end of a torch is receded provisionally toward the welding starting point on a welding line thereby to resume the welding operation from the particular welding restarting point. As a consequence, as compared with a system in which the welding operation is restarted from a provisional stoppage point, a welding fault such as arc vanishing is not likely to occur.

BRIEF DESCRIPTION OF THE DRAWINGS

FIG. 5 is a circuit block diagram showing a robot controller of the robot system shown in FIG. 4.

FIGS. 8A-8E are diagrams useful for explaining a method of determining a welding restarting point according to an embodiment of the present invention.

FIG. 10 is a diagram useful for explaining memory means according to the present invention.

DESCRIPTION OF THE PREFERRED EMBODIMENTS

A system for welding robot control according to the present invention will be explained in detail below with reference to an embodiment shown in the accompanying drawings.

Figure 1B:
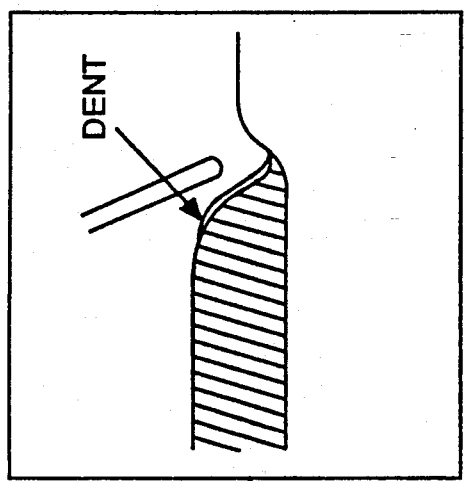
FIG. 1 is a diagram for explaining the cause of an arc vanishing.
Figure 1A:
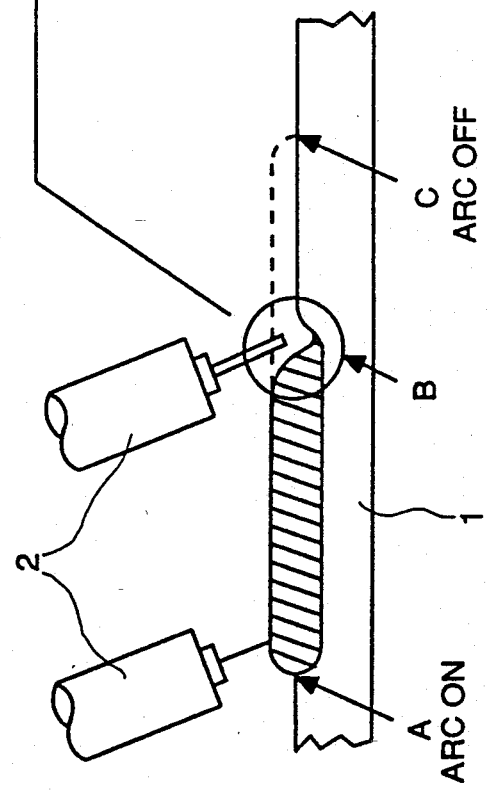
Figure 2:
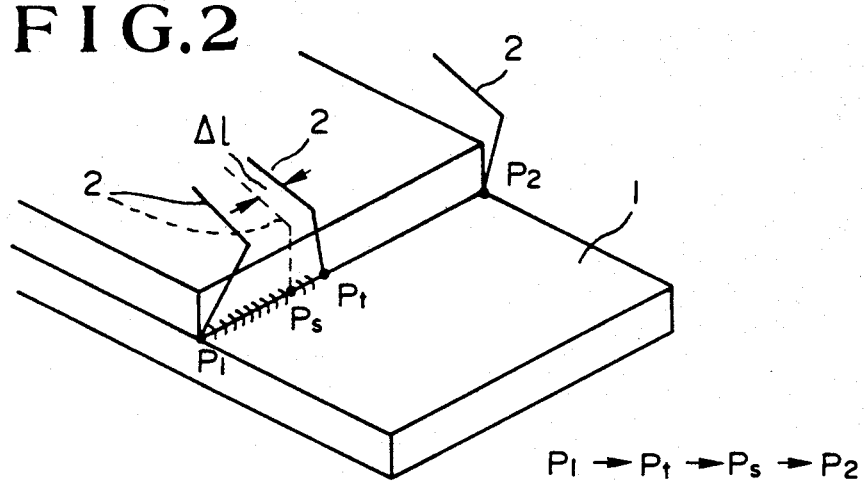
FIG. 2 is a diagram showing a prior art welding operation with a robot.
Figure 3:
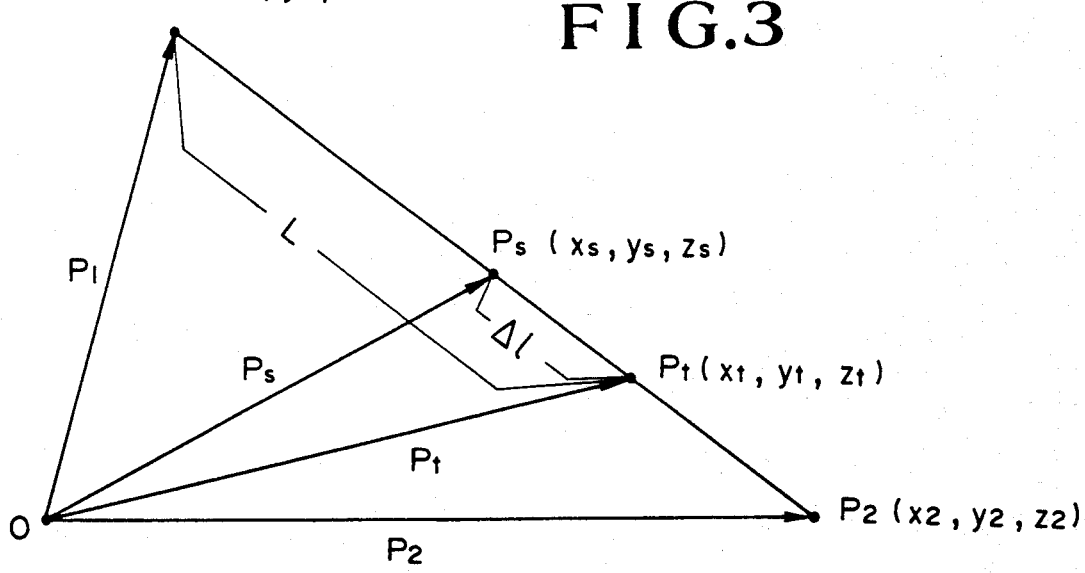
FIG. 3 is a vector diagram for calculating a welding restarting point in the prior art method.
Figure 4:
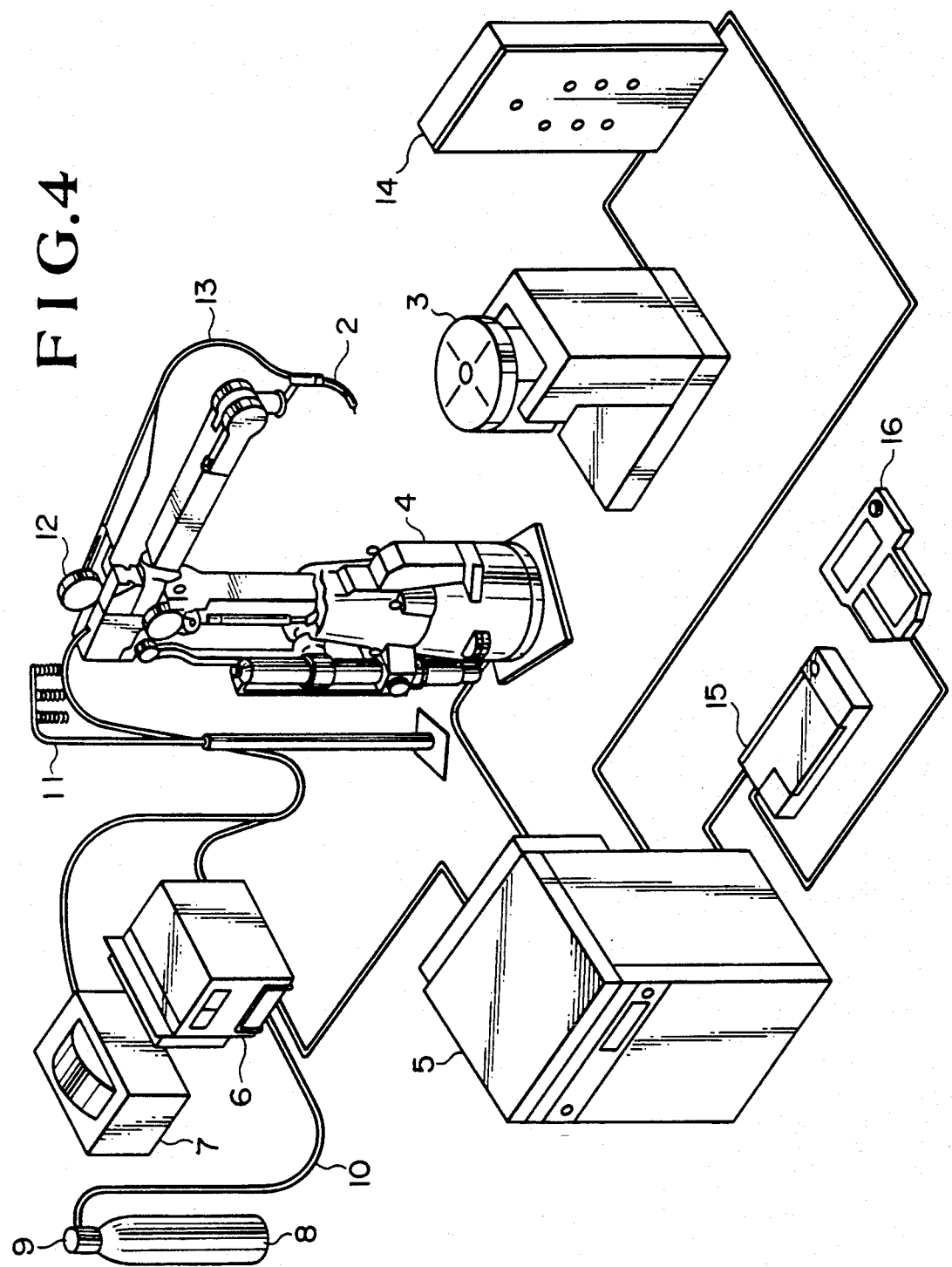
FIG. 4 is a diagram showing a hardware configuration of a robot system according to an embodiment of the present invention.

First, a configuration of a robot system according to an embodiment of the present invention is shown in FIG. 4. In FIG. 4, reference numeral 2 designates a welding torch, numeral 3 a positioner for rotating a workpiece mounted thereon into position, numeral 4 a robot, numeral 5 a robot controller, numeral 6 a welding machine, numeral 7 a reel stand, numeral 8 a gas cylinder, numeral 9 a gas regulator, numeral 10 a gas hose, numeral 11 a suspension stand, numeral 12 a wire feeder, numeral 13 a conduit cable, numeral 14 a position controller, numeral 15 a control panel and numeral 16 a teaching unit. A robot system configured in this way is a very common one, and therefore the general operation thereof will not be described.

FIG. 5 is a block diagram showing an embodiment of a welding robot control system according to the present invention as accommodated in a robot controller 5.

In FIG. 5, numeral 300 designates a central processing unit (CPU) for main control of the system. Numeral 301 designates a main memory. Numeral 302 designates an auxiliary memory for storing a program including data necessary for robot operation, such as position data of welding points, welding rate, method of interpolation and designation of arc on/off. Numeral 16 designates a programming unit including a screen and a keyboard for programming a robot operation. Numeral 303 designates a programming unit interface. Numeral 304 designates a servo operation or computation circuit for positional servo control of each axis of the robot arm. Numeral 305 designates a servo amplifier for amplifying an output signal from the servo computation circuit. Numeral 306 designates a motor driven by an output (command value) of the servo amplifier 305. Numeral 307 designates a pulse encoder connected to the motor 306, and adapted to produce an output signal (present position of the robot arm axis) which is fed back to the servo computation circuit for performing the servo control to reduce to zero the error between the command value and the present position. Each set of means designated by numerals 305, 306 and 307 is provided for each of the six robot axes. In similar fashion, a set of a servo operation or computation 304', a servo amplifier 305', a motor 306' and a pulse encoder 307' is provided for each of the six axes of the positioner. Numeral 308 designates an input-output interface for controlling the exchange of signals between various peripheral units 309 including a fence surrounding the periphery of the system, a stop button for giving an instruction to stop the operation, a belt conveyor, and the like and the controller. Numeral 310 designates a welding machine interface for controlling the exchange of various signals (command signals for voltage or current values, a signal indicating a fault and the like) between the welding machine 6 and the main control unit.

FIGS. 6A to 6D are diagrams for explaining the welding operation of the robot 4 and the positioner 3 according to an embodiment of the present invention.

In this example, a workpiece 1 is a circular base material 1a and a cylindrical member 1b to be welded thereto. These members are securely mounted on the positioner 3. While this positioner 3 is being rotated, the torch 2 mounted at the finger point of the robot 4 is caused to perform the welding work from the welding starting point $P_1$ toward the welding ending point $P_2$.

Figure 6A:
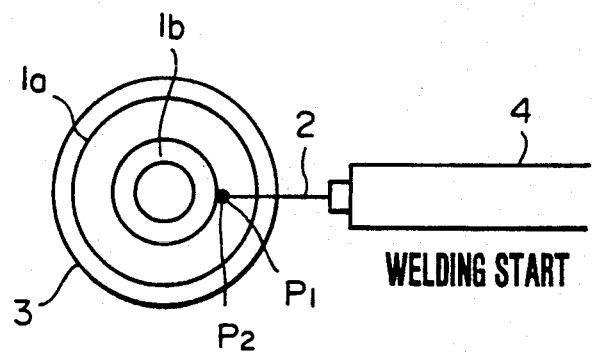
FIGS. 6A to 6D are diagrams for explaining the welding operation according to an embodiment of the present invention.
Figure 6B:
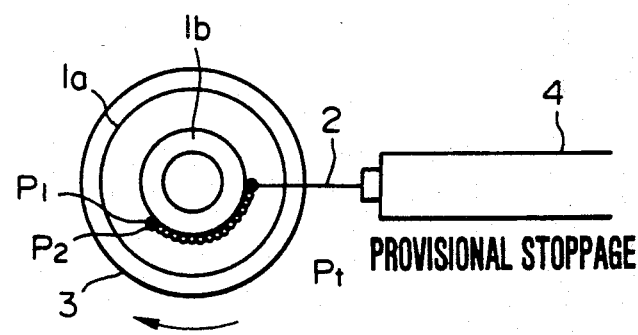

Now, assume that after the welding operation is started from the welding starting point $P_1$ as shown in FIG. 6A, the robot control unit 5 has provisionally stopped the positioner 3 for some reason or other at the point Pt intermediate the welding starting point $P_1$ and the welding ending point $P_2$.

In the prior art mentioned above, the apparatus is restarted so that the robot turns the arc on at the provisional stoppage point Pt, thereby undesirably starting the movement toward the welding ending point $P_2$.

At the provisional stoppage point Pt, however, a welding fault like arc vanishing is generally likely to occur, and for this reason, a welding fault often occurs according to the conventional technique described above.

Figure 6C:
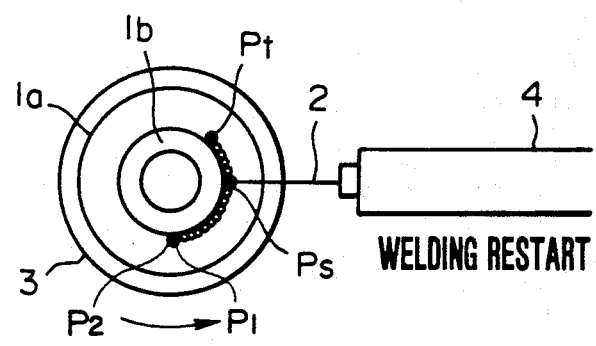
Figure 6D:
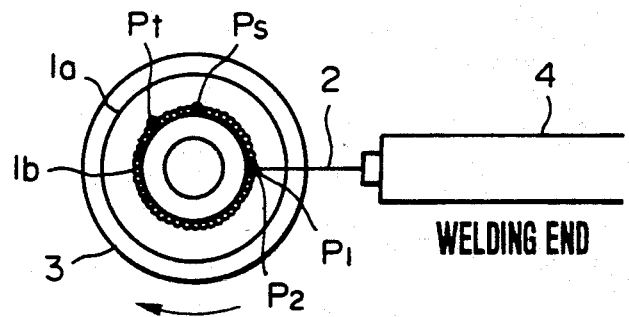

In view of this fact, according to the embodiment under consideration, when the welding operation is provisionally stopped, in order to prevent a welding fault like arc vanishing at the time of restarting, the welding restarting point Ps is determined with the torch moved toward the welding starting point $P_1$ on the welding line as shown in FIG. 6C, so that the positioner 3 is relocated until the arrival of the torch 2 at the welding restarting point Ps. After the arrival of the torch 2 at the welding restarting point Ps, the welding operation is resumed toward the welding ending point $P_2$ as shown in FIG. 6D.

Now, the function of moving the positioner 3 until the arrival of the torch 2 at the welding restarting point Ps on the welding line at the time of restarting will be explained below with reference to FIGS. 7 and 8.

Figure 7:
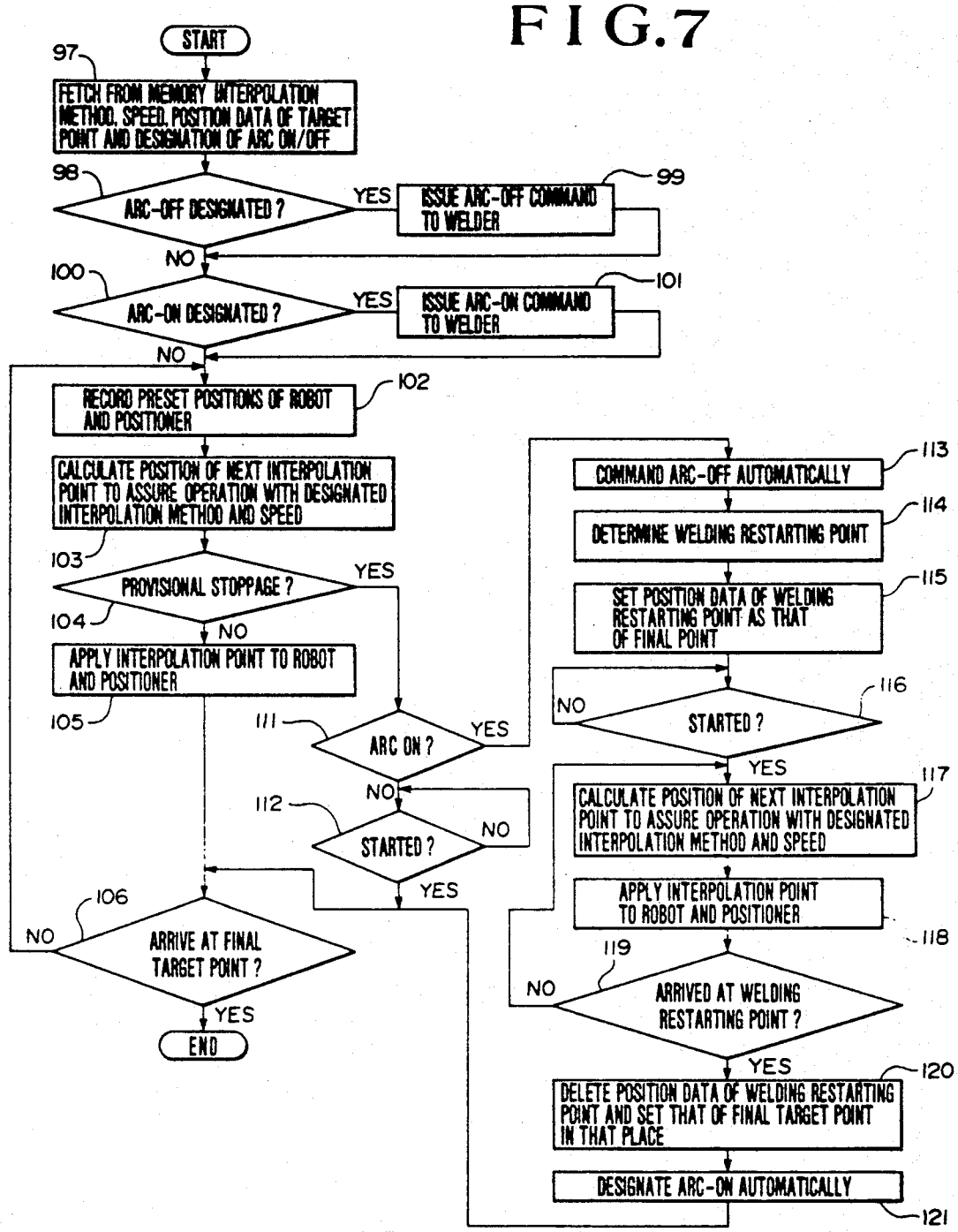
FIG. 7 is a flowchart showing a method of robot control (internal processes of a robot control system) according to an embodiment of the present invention.

FIG. 7 is a flowchart showing the internal process of the robot controller 5 according to an embodiment of the present invention. In FIG. 7, steps 97 to 106 represent the normal operation, and steps 111 to 121 represent a provisional stoppage.

In the normal operation mode, the robot controller 5 operates the robot 4 and the positioner 3 in accordance with the steps 97 to 106.

Step 97 fetches from the memory means 302 data such as the position of a target point $P_2$, interpolation method, speed and designation of arc on/off required for operating the robot 4, the welding machine 6 and the positioner 3. The step 98 checks to see whether the arc-off is designated or not. In the presence of an arc-off designation, step 99 issues an arc-off command to the welding machine 6. In the absence of an arc-off designation, on the other hand, the process proceeds to the next step 100. Step 100 checks to see whether an arc-on is designated or not. If an arc-on is designated, an arc-on command is issued to the welding machine 6, while in the absence of an arc-on designation, the process is passed to the next step 102. At step 102, the present positions of the robot 4 and the positioner 3 are recorded. This step 102 is specific to the present invention.

Step 103 calculates the next point of interpolation in order that the robot 4 and the positioner 3 operate at a designated speed in accordance with a designated interpolation method.

Step 104 checks whether a provisional stoppage is involved, and if so, the process is jumped to the provisional stoppage step 111.

Step 105 operates the robot 4 and the positioner 3 to the interpolation point determined at step 103.

Step 106 compares a final target point with the present positions of the robot 4 and the positioner 3, and if the target point is found to have been reached, the process is terminated, while if it has not yet been reached, the process jumps to step 102.

In the provisional stoppage mode, the robot controller 5 operate the robot 4, the welding machine and the positioner 3 in accordance with the steps 111 to 121.

Step 111 checks to see if an arc-on command is issued to the welding machine from the controller, and if so, the process is passed to step 113, and in the case of an arc-off command, by contrast, to step 112. Because the welding operation is not proceeding, step 112 decides whether a command for restarting the movement of the robot and the positioner has been issued or not. In the presence of such a command, the process is jumped to step 106, thereby starting the movement from the provisional stoppage point Pt to a target point that is the welding ending point $P_2$. Because the welding operation is proceeding, an arc-off command is automatically issued to the welding machine at step 113.

Step 114 detects a predetermined data from among the present position data recorded at step 102, thereby determining the welding restarting point Ps.

Step 115 sets the welding restarting point Ps determined at 114 as a position data of the welding ending point $P_2$ which is an original final target point.

Step 116 decides whether the welding operation (i.e., operation under arc-on) has been started by the operator, and if so, the process jumps to step 117, thereby starting the operation from the provisional stoppage point toward a target point (the welding restarting point Ps in the case under consideration).

Step 117 calculates the next point of interpolation in order for the robot 4 and the positioner 3 to operate at a designated speed in accordance with the method of interpolation designated at step 97. A welding speed which is different from that designated at step 97 may be designated.

Step 118 urges the robot 4 and the positioner 3 to move the interpolation point determined at step 117.

Step 119 compares a target point (the welding restarting point Ps in the case under consideration) with the present positions of the robot 4 and the positioner 3, and if the target point has been reached, the process jumps to step 120, while if not, to step 117.

By repeating the processes from steps 117 to 119 mentioned above, the robot 4 and the positioner 3 are operated as required to move from the provisional stoppage point Pt to the welding restarting point Ps.

Step 120 deletes the positional data on the welding restarting point, and replaces it by setting the positional data of the final target point as a target point. As a consequence, the positional data of the
target point is set to the original target point which is the welding ending point $P_2$.

Step 121 applies an arc-on command to the welding machine, and the process jumps to step 106. As a result, the robot 4 and the positioner 3 start the welding operation, moving from the welding restarting point Ps to the welding ending point $P_2$.

Now, a method of determining the welding restarting point Ps will be explained with reference to FIGS. 8A to 8E.

Figure 8A:
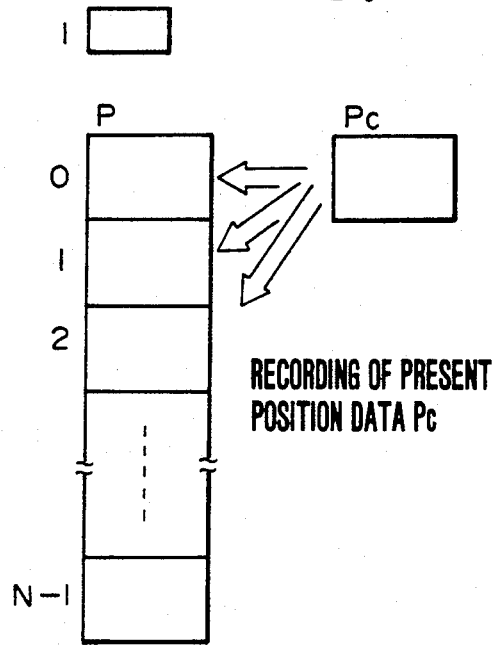
Figure 8B:
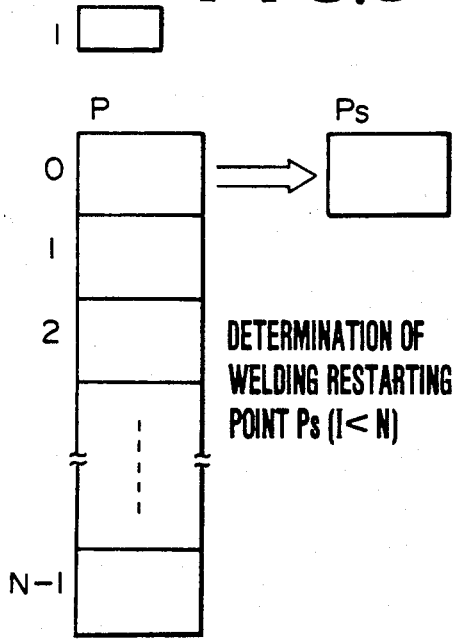
Figure 8C:
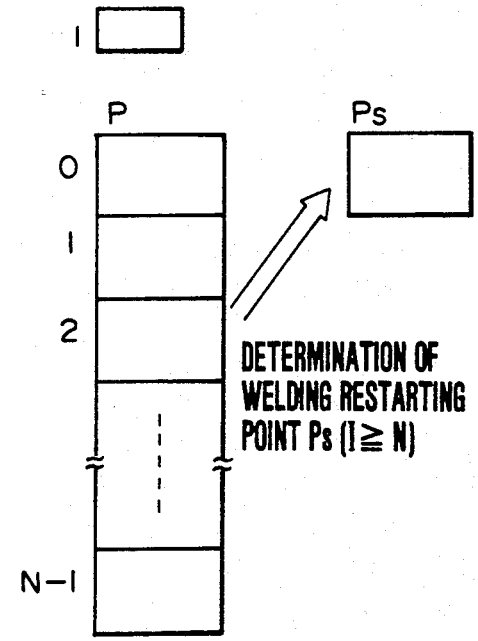

In FIGS. 8A to 8C, reference character Pc designates present position data of the robot 4 and the positioner 3, character P present-position history data, and character I a history data counter.

The present position data Pc has stored therein the positions of the robot 4 and the positioner 3 as of the time of reading such data (step 102).

Referring to FIG. 8A, the present-position history data P represents an area for recording a maximum number N of the present position data Pc in chronological order. From the leading point, numbers 0, 1, 2, ..., N−1 are assigned, whereby the second data is referred to, say, as P(2).

The history data counter I has stored therein the number of the present position data Pc recorded in the present-position history data P. The initial value of this history data counter I is zero.

As long as the robot 4 and the positioner 3 are operating normally, step 102 in FIG. 7 causes the present position data Pc to be recorded in the present-position history data P at predetermined regular time intervals T, with 1 (one) added to the value of the history data counter I. When data is recorded at P(N−1) which is the (N−1)th area of the present-position history data P, similar data is recorded again at P(0) which is the 0-th area of the present-position history data P, followed by the circulation to record the present position data Pc in the present-position history data P. Specifically, $$P(I \bmod N) \leftarrow Pc \quad (4)$$

$$I \leftarrow I + 1 \quad (5)$$

where "mod" is an operator for determining a residue, and the arrow indicates substitution.

This process enables the present-position history data P, as long as the robot 4 and the positioner 3 operate in normal fashion, to have recorded therein the positional data of a maximum of N last passed points by the robot 4 and the positioner 3.

Of all these data, the last-passed point and the first-passed point can be referred to in the manner mentioned below.

When $I = 0$,
$P(0)$ \quad (6)

and when $I > 0$,
$P((I \bmod N) - I)$ \quad (7)

Point first passed:
When $I < N$,
$P(0)$ \quad (8)

and when $I \geq N$,
$P(I \bmod N)$ \quad (9)

Supposing that the welding restarting point Ps is the oldest passed point of the recorded points, when $I < N$, the positional data of the welding restarting point Ps is the data recorded at the 0-th area of the history data P, according to equation (8), as shown in FIG. 8B. As shown in FIG. 8D, the point Ps corresponds to $P_1$.

When $I \leq N$, on the other hand, as shown in FIG. 8C, the positional data of the welding restarting point Ps is the data recorded at the (I mod N)th area of the history data P according to equation (9). As shown in FIG. 8E, the point Ps corresponds to the oldest data of the recorded last passed N points.

Now, assume in FIG. 7 that if the operation is suspended during the welding process in the arc-on mode (that is, during the welding operation), according to equations (8) and (9), the step 114 selects the first-passed point, i.e., the oldest-passed point of the present-position history data P in record as a welding restarting point Ps. As a result of this process, the welding restarting Point Ps is set at a time point earlier than the point of provisional stoppage by the time Δt given by equations (10) and (11). Specifically, when $I < N$,
$\Delta t = IT$ \quad (10)

and when $I \geq N$,
$\Delta t = NT$ \quad (11)

where T is the recording period of the present position data Pc.

At steps 115 to 116 in FIG. 7, the welding restarting point Ps determined as above is set as a positional data of the welding ending point $P_2$ providing the original final target point, and after accepting the start command, steps 117 to 119 cause the robot 4 and the positioner 3 to move from the provisional stoppage point Pt to the welding restarting point Ps, so that after reaching the provisional stoppage point Pt, steps 120 and 121 set the positional data of the original final target point in place of that of the welding restarting point as a target point again and turns the arc on, followed by jumping to step 102, thereby making it possible to proceed from the welding restarting point Ps to the welding ending point $P_2$ which is the original target point.

Figure 9A:
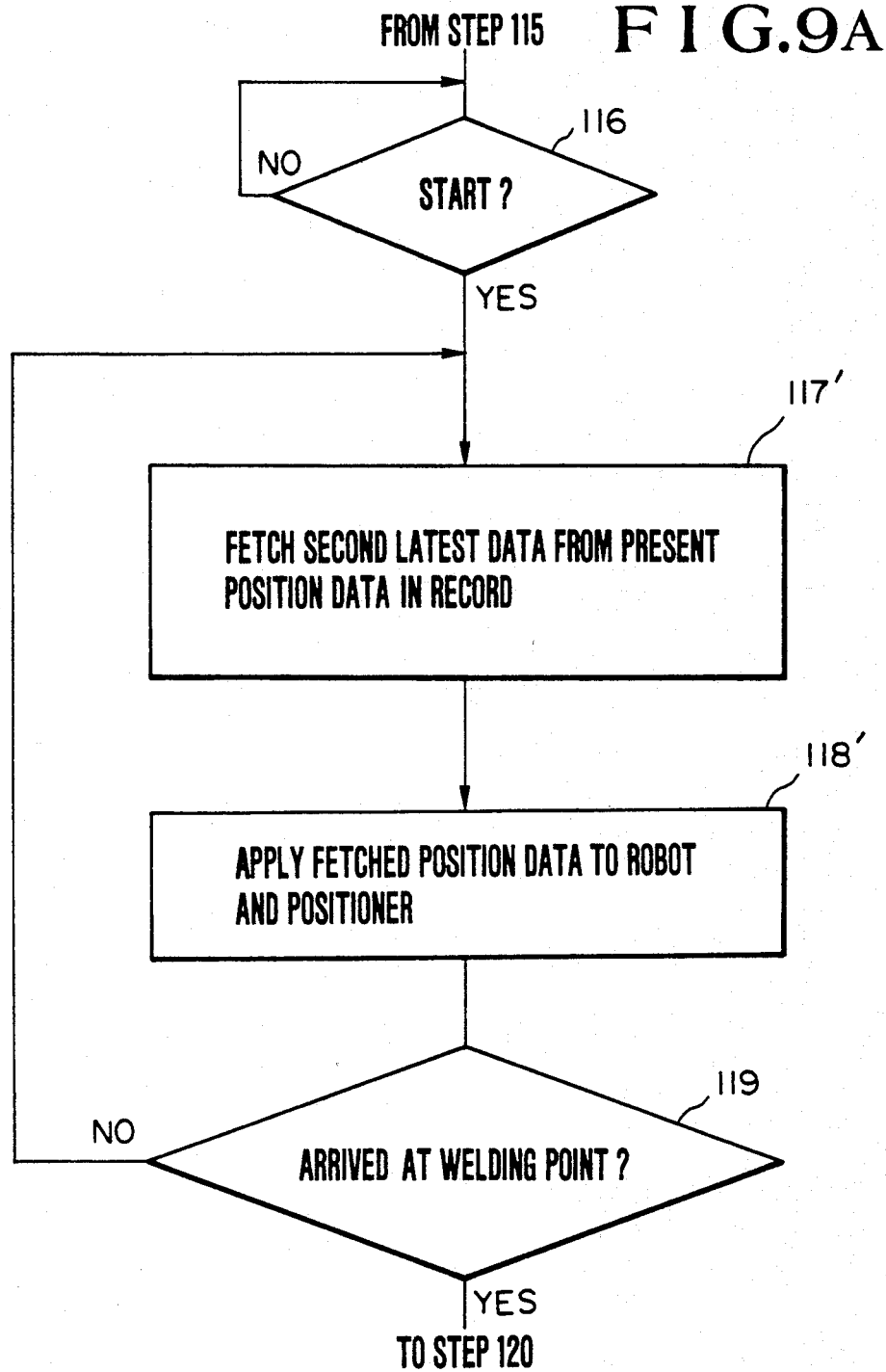
FIG. 9A is a flowchart showing a method of robot control according to another embodiment of the present invention.

FIG. 9A is a diagram showing a part of a flowchart representing the internal process of a robot control system according to another embodiment of the present invention. This flowchart is different from that of FIG. 7 only in that the steps 117, 118 in FIG. 7 have been replaced by steps 117' and 118' respectively, while the other parts remain identical. Steps 117', 118' and related other steps will be explained, while the description of the remaining steps will be omitted.

At the time of provisional stoppage, step 115 sets the positional data of the welding restarting point to be that of the final target point, followed by step 116 for detecting the start by the operator. Upon detection of this start, step 117' takes out the data immediately preceding the latest data from the present position data in record. At step 118', the data thus taken out is applied to the robot and the positioner, which are thereby moved toward a position indicated by the data taken out. Step 119 decides whether the robot and the positioner have reached the welding restarting point, and if not, the process returns to step 117'. In this way, steps 117' and 118' are repeated, so that when step 119 decides that the robot and the positioner have reached the welding starting point, the process is passed to the next step 120.

Figure 9B:
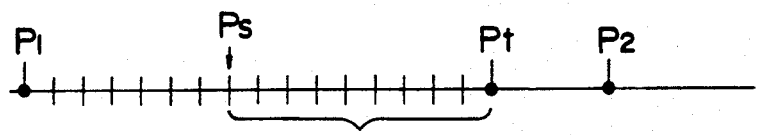
FIG. 9B is a diagram useful for explaining the method shown in FIG. 9A.

As will be understood from the foregoing description, according to the present embodiment, the robot and the positioner proceed reversely along the same route as the one taken in the welding operation, when returning from the provisional stoppage point to the welding starting point, as shown in FIG. 9B.

In returning to the welding restarting point, all of the present position data are not required to be taken out.

Specifically, the returning speed may be improved by taking out simply every predetermined number of data.

The recording of the present position data will be explained more in detail with reference to FIG. 10.

As explained with reference to FIGS. 8A to 8E, the present position data Pc are recorded in terms of both the robot and the positioner. As a result, regardless of whether the robot and the positioner operate independently of each other or in joint fashion, it is possible to return them to a predetermined welding starting point.

FIG. 10 is a diagram showing data used for controlling the robot arm axes and the auxiliary axes (positioner). In FIG. 10, with regard to the robot arm, the command value, present position and the error therebetween are used for controlling each of the six axes. A maximum of six auxiliary axes may also be controlled. In the case shown, however, only one axis is controlled.

The present position Pc in terms of the robot arm and the auxiliary axes is recorded in pair as a present-position history data P.

The reason for using the present position for control is that there is a difference between the command value and the present position, so that the use of the present position permits the return to the welding starting point with higher accuracy. The present-position history data P is storable in a main memory or an auxiliary memory.

According to the present invention, in a system for performing the welding operation by the operation of more than one apparatus including a robot, a positioner and the like, the welding operation is restarted after a torch is moved toward a welding starting point on a welding line from a provisional stoppage, if any, at the time of restart from such provisional stoppage. As a consequence, unlike in the case where the welding operation is restarted from a provisional stoppage point, such a fault as arc vanishing is prevented and the downtime is reduced while at the same time a stable welding quality is provided.

Further, the present invention is applicable to the welding operation in a desired combination of two or more units, with the result that not only an independent operation of either a robot or a positioner but also a coordinated operation between a plurality of positioners or between a robot and a positioner is made possible to control.

Furthermore, according to the present invention, the position of the welding starting point is not determined analytically but by taking out an interpolation point recorded during operation. For this reason, a given interpolation method as well as linear interpolation is applicable. Also, the invention, which is not dependent on the mechanism of an object of control, is applicable to robots and positioners of the desired functions with equal effect.

We claim:

1. A welding robot control system for performing a welding operation with a torch along a welding line from a beginning point to a final point wherein during the welding operation a provisional stoppage may occur, comprising: means for controlling said torch to move said torch to a particular position along the welding line thus far traced before restarting the welding operation after the stoppage, memory means for holding actual position data sequentially along the welding line during the welding operation, and computation means for computing said particular position in accordance with the position data held in said memory means during the provisional welding operation stoppage.

2. A welding robot control system for performing a welding operation by controlling at least one of a robot for supporting a welding torch and a positioner for movably supporting a workpiece, comprising:
   means for sequentially calculating data on positions making up a welding route on the basis of inputted information;
   first control means for controlling the robot and/or the positioner to move to the position indicated by the position data calculated;
   means for maintaining a current record of a predetermined number of position data on actual positions of said one of the robot and the positioner for each new position thereof during the welding operation, including updating the position data with data of each new position; and
   means responsive to an interruption of the welding operation for determining a restart position from among said current record of position data, including
   second control means for extracting at least one specific position from the current record of position data as said restart position and controlling said one of the robot and the positioner to move to the restart position indicated by the specific position.

3. A system according to claim 2, wherein said specific position is the first position still maintained by said maintaining means.

4. A system according to claim 2, wherein said second control means includes means for extracting all the recorded position data one by one in reverse chronological sequential order and moving the robot and/or the positioner to a position indicated by the oldest position data sequentially along positions represented by the extracted position data.

5. A method of controlling a robot welding system for performing a welding operation by controlling at least one of a robot for supporting a welding torch and a positioner for movably supporting a workpiece on which the welding is performing comprising:
   a first step of storing data of a present position of said one of said robot and the positioner in one of a predetermined number of memory areas held by a memory means;
   a second step of calculating data on the movement of said one of the robot and the positioner form the present positions to a next position on the basis of input teaching information;
   a third step of detecting a selected one of the presence and absence of a command for provisional stoppage of said one of the robot and the positioner;
   a fourth step of determining a welding restarting point by returning to the first step in the absence of detecting a provisional stoppage and determining a welding restarting point on the basis of the contents of the memory means in the presence of detecting a provisional stoppage;
   a fifth step of returning said one of the robot and the positioner to the welding restarting point; and
   a sixth step of deciding whether said one of the robot and the positioner has reached a final target point and, if not, continuing with the first step.

* * * * *